United States Patent

Coleman

[11] Patent Number: 5,848,180
[45] Date of Patent: Dec. 8, 1998

[54] COLOR BITMAP GENERATION WITH BACKGROUND DEPENDENT BLACK OBJECTS

[75] Inventor: Robert M. Coleman, Altadena, Calif.

[73] Assignee: Xerox Corporation, Stamford, Conn.

[21] Appl. No.: 673,541

[22] Filed: Jul. 1, 1996

[51] Int. Cl.[6] .................................................. G06K 9/00
[52] U.S. Cl. .......................... 382/162; 382/163; 382/276; 382/283; 382/284; 358/529; 358/534; 358/535; 358/536; 395/109
[58] Field of Search ..................................... 382/162, 163, 382/283, 284, 276; 358/534, 535, 536, 529; 395/109

[56] References Cited

U.S. PATENT DOCUMENTS

| | | | |
|---|---|---|---|
| 4,725,966 | 2/1988 | Darby et al. | 364/518 |
| 5,241,396 | 8/1993 | Harrington | 358/296 |
| 5,541,743 | 7/1996 | Shiorni et al. | 358/534 |
| 5,543,941 | 8/1996 | Parker et al. | 358/534 |
| 5,546,197 | 8/1996 | Shibazaki et al. | 358/534 |
| 5,555,475 | 9/1996 | Perowne et al. | 358/462 |
| 5,631,748 | 5/1997 | Harrington | 358/502 |
| 5,657,137 | 8/1997 | Perumal, Jr. et al. | 358/502 |
| 5,675,716 | 10/1997 | Shu | 395/109 |

Primary Examiner—Leo H. Boudreau
Assistant Examiner—Kanji Patel
Attorney, Agent, or Firm—Robert Cunha

[57] ABSTRACT

A bitmap-based digital color printing method and system is described which automatically detects when a black object is commanded to be printed, and changes the Bit Block Transfer (BitBlt) method so that the resultant composition of the black color at each point in the bitmap is responsive to the amount of non-black colorants already existing in the background color at that position on the page. For many printing systems the resulting prints exhibit fewer visual defects. Single-color black objects printed on top of a color field are printed as process black responsive to the background color. Therefore, they exhibit a greater density and gloss and show fewer problems caused by the misregistration of separations or other printer defects, such as white fringes around the black objects. They also avoid problems caused by excessive ink coverage differences between foreground black and background color. Conversely, process black objects not on a color background may be printed as single-color black objects and therefore do not exhibit objectionable process black problems such as color fringing, excessive colorant, and excessive gloss contrast with the background.

4 Claims, 12 Drawing Sheets

COLOR BITMAP GENERATION WITH BACKGROUND DEPENDENT BLACK OBJECTS

BACKGROUND OF THE INVENTION

1. Field of the Invention

The present invention relates to bitmap-based digital color printing in which black objects and color objects are intermixedly printed and more particularly, in which the composition of the black color for the black objects is automatically changed to be responsive to the amount of non-black colorants in the background color.

2. Description of the Related Art

Bitmap-based digital color printers form a bitmap for each of several separations, such as cyan, magenta, yellow, and black. Each bitmap—one bitmap for each color separation—contains a 1 or a 0 for each point on the page which the print head of the color printer is able to address. By this method, the print head of the printer is instructed to turn on or off at each addressible point on the page. The bitmap for each color separation separately commands the print head which is assigned to print that particular color separation. Often, a full-color bitmap-based digital printer will construct a bitmap for cyan, magenta, yellow, and black, and then print each bitmap overlayed on the same page to produce a multitude of perceived colors through the combination of differing amounts of cyan, magenta, yellow, and black.

In particular, the color black may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is known as process black. The color black may also be formed by using the black colorant alone. In this case, it is known as single-color black.

Each type of black, process black and single-color black, have advantages and disadvantages when used in different contexts in the printing process.

When single-color black is used over a color field, it is often the case that the single-color black colorant has a gloss which is different from the gloss of the surrounding color field, and the gloss difference can be objectionable. Further, the maximum density of the single-color black colorant is often not as great as the maximum density obtainable with process black, and the density difference is particularly noticeable on certain color backgrounds. Also, the ink coverage or toner pile height of single-color black may be noticeably less than that of the surrounding color background. Finally, the presence of misregistration between the plurality of separations during the printing process, or the presence of other interactions between the separations, can result in objectionable white or light-colored fringing around a single-color black object on a color background. This occurs for example if the single-color black colorant is not printed precisely and without distortion into the hole left at that position when printing the other separations.

On the other hand, when process black is used in a white or grey field which does not contain any non-black colorants, slight misregistrations or interactions among the plurality of separations can result in objectionable color fringing at the edges of the object. Furthermore, the use of multiple colorants to form process black can result in blurred edges, thickened objects, and objectionable amounts of ink or toner coverage.

Process black can also cause problems if the same formulation of process black is used against a variety of color backgrounds. For example, a dense process black with a large amount of colorant, which might be suitable for printing over a dense or dark color background, when printed on a light colored background can create pile height or ink coverage differences between the black object and its light colored background. This can result in printing defects such as tactile unevenness or toner deletion in the background color surrounding the black object. A process black with smaller values of C, M, Y may be better suited for light backgrounds, but can show problems of "caving" if its total pile height is less than the height of the surrounding background for darker backgrounds. Further, if the C, M, Y content of a process black is significantly less than that of the color background, the chances for showing light fringes around the process black object due to misregistration is increased.

These advantages and disadvantages of single-color and process black are known in the graphics arts industry, and knowledgable graphic artists attempt to design pages which utilize the advantages and avoid the disadvantages. However, some situations, such as a black object placed only partially over a color field, or a color background which changes rapidly, or complex text or graphics over a complex color background, makes it difficult to avoid the printing problems associated with mixedly printing black and color. Furthermore, many pages not designed by a knowledgeable graphic artist can benefit from a method and apparatus to automatically create a background dependent black image.

U.S. Pat. No. 4,700,399 to Yoshida discloses a color image processing apparatus which has an edge detector and a control unit for controlling a black reproduction quantity for an edge according to an output from the detector. For edges, densities of color signals for yellow, magenta, and cyan are reduced in accordance with the edge quantity to increase black density.

U.S. Pat. No. 4,953,015 to Hayasaki et. al. discloses a method for printing a color image which makes it possible to obtain a higher density black. Black ink is placed first, and then a plurality of other inks such as cyan, magenta, and yellow are allotted according to a color matrix table and are superimposed on at least a portion of the black ink.

U.S. Pat. No. 5,241,396 to Harrington discloses a method for printing a color image which yields dense black images without thickened blurred edges. A modified black bitmap is produced by eroding the edges on the original black bitmap. The modified black bitmap is used to instruct the printing of at least one other colorant and then the original black bitmap is used to print the black colorant to yield a dense black image.

These methods have in common the attempt to limit the blurring disadvantages of process black on a white background so that it can be used in place of single-color black. By contrast, the current invention describes a bitmap color printing method which modifies the normal bit block transfer method by which objects are merged into a bitmap prior to printing, in order to be able, without prior knowledge of the current content of the bitmap, to change a black color as it is being merged into the bitmap so that its colorant content is responsive to the background color. (The background color may include white). This helps to maximize print quality when intermixedly printing black objects and color objects.

OBJECTS AND SUMMARY OF THE INVENTION

One object of the present invention is to provide a method for determining when a black object is being printed and changing the method for merging it into a bitmap when such a change would increase the gloss of the black color to better conform to the gloss of a color background.

Another object of the present invention is to provide a method for determining when a black object is being printed and changing the method for merging it into a bitmap when such a change would increase the maximum density of the black color to better conform to the maximum density of a color background.

Another object of the present invention is to provide a method for determining when a black object is being printed and changing the method for merging it into a bitmap when such a change would increase the total colorant coverage of the black color to better conform to the total colorant coverage of a color background.

Another object of the present invention is to provide a method for determining when a black object is being printed and changing the method for merging it into a bitmap when such a change would decrease the objectionable printing defects caused by misregistration or interactions of the black color with a color background.

Another object of the present invention is to provide a method for determining when a black object is being printed and changing the method for merging it into a bitmap when such a change would decrease the blurring, thickening, and color fringing at the edges of a black object when printed on a white background or a background with no non-black colorants.

Another object of the present invention is to provide a method for determining when a black object is being printed and changing the method for merging it into a bitmap when such a change would decrease the total colorant coverage of a black object when printed on a white background or a background with no non-black colorants.

To achieve the foregoing and other objects and to overcome the shortcomings discussed above, a bitmap-based digital color printing method and system is provided which automatically detects when a black object is commanded to be printed, and changes the method by which the black object is merged into the bitmap of each of the color separations in such a way that the composition of the black color is responsive to the colorants already present in the bitmap at the position on the page at which the black object is commanded to be printed. As objects are commanded to be printed, a detection operation detects if the objects are commanded to be printed in a black color—either a single-color-black or a process black. If so, an alternate Bit Block Transfer (BitBlt) method is chosen which merges the black color into the existing bitmaps in a way which is responsive to the background color already in the bitmap. Because a bitmap generally is composed of bits which have been generated by a half toning process, it is unduly time-consuming to take a step of determining the actual color which has previously been commanded to be printed at the location at which the black object is commanded to be printed. Therefore, the alternate BitBlt method used is one which is not dependent on prior knowledge of the background color. Instead, since a typical BitBlt operation consists of the steps of Read, Modify, Write, the Modify step in the case of a black object is adjusted to be responsive to the information obtained by the Read operation. In this way, the resulting Write operation writes a black color which is responsive to the existing color in the bitmap prior to the black object being written.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
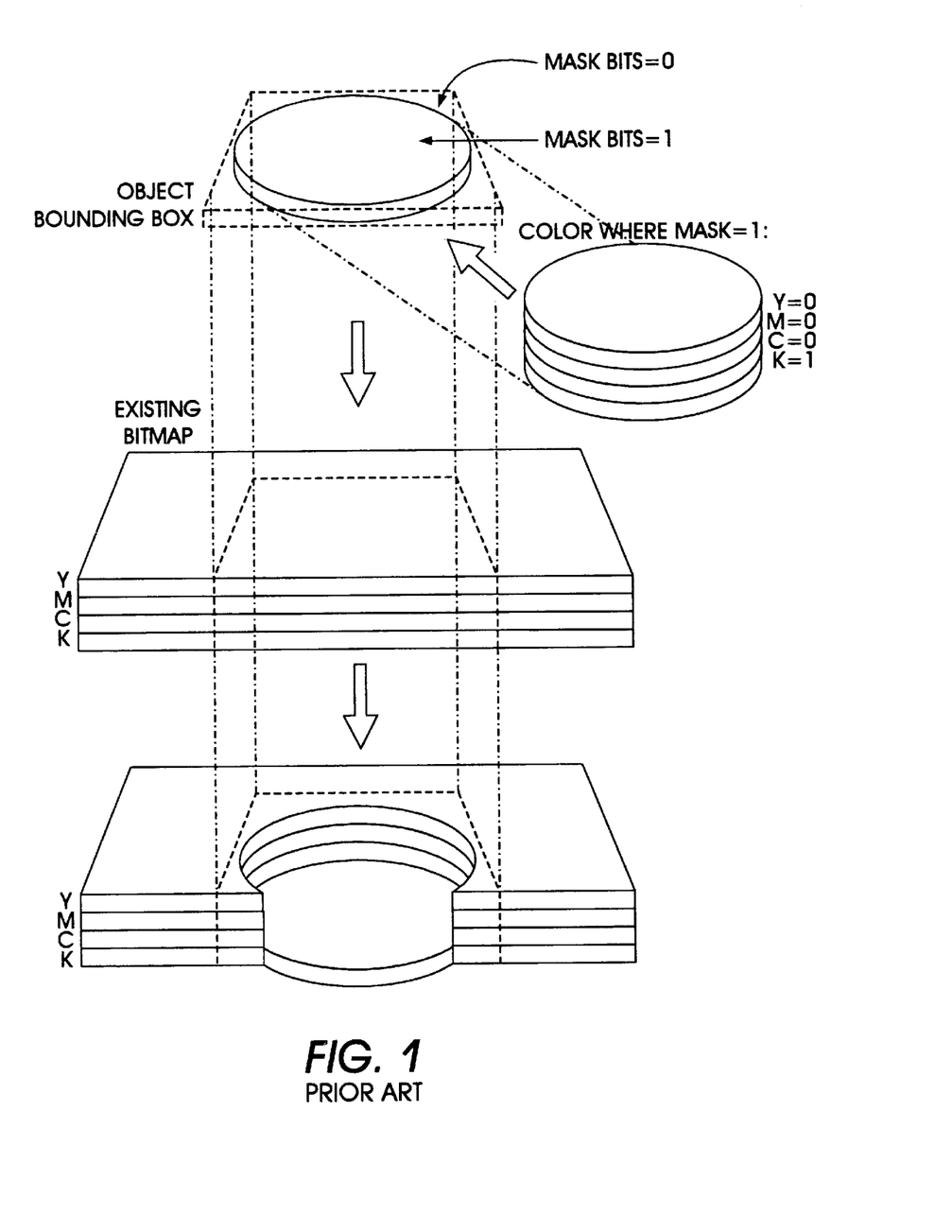
FIG. 1 shows a method of the prior art by which a single color black object is merged into existing separation bitmaps during page preparation process.

Referring now to the drawings, and particularly to FIG. 1 thereof, a single-color black object is shown being merged into an existing set of bitmaps, one bitmap per separation, which in this case comprise cyan (C), magenta (M), yellow (Y), and black (K). The object is defined by 1) a bounding box showing the maximum extent of the object, 2) a mask showing the actual shape of the object, and 3) a color which is in effect wherever the mask is on. In the prior art, for each separation bitmap, the merging process causes the color value of that separation to be written into the bitmap, obliterating whatever values were in that separation previously. In the case of a single-color black, where the non-black separation values are all 0 (white), the effect is to erase the non-black separations (ie, to put no colorant on the page so that the paper white shows through). The black separation is then written as full-black value (1) into the black separation. The net effect is a hole in the other separations and a black object at the bottom of that hole.

Figure 2:
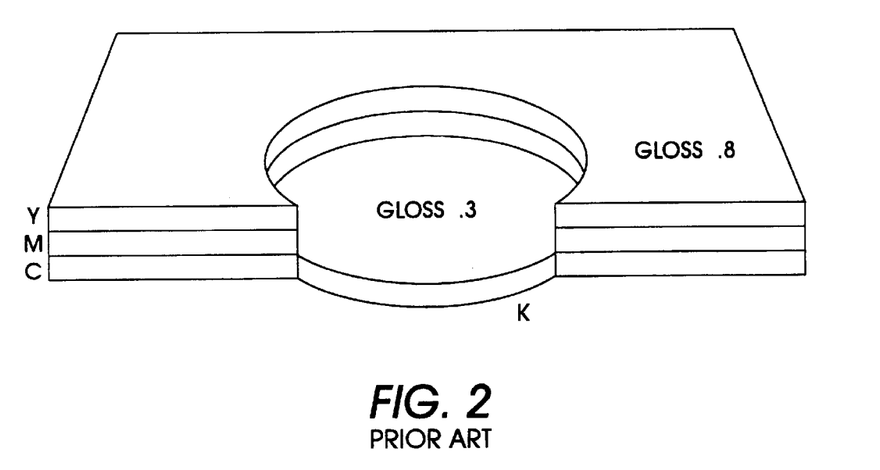
FIGS. 2 and 3 show sample outputs which demonstrate print quality problems produced by following the prior art method illustrated in FIG. 1.
Figure 3:
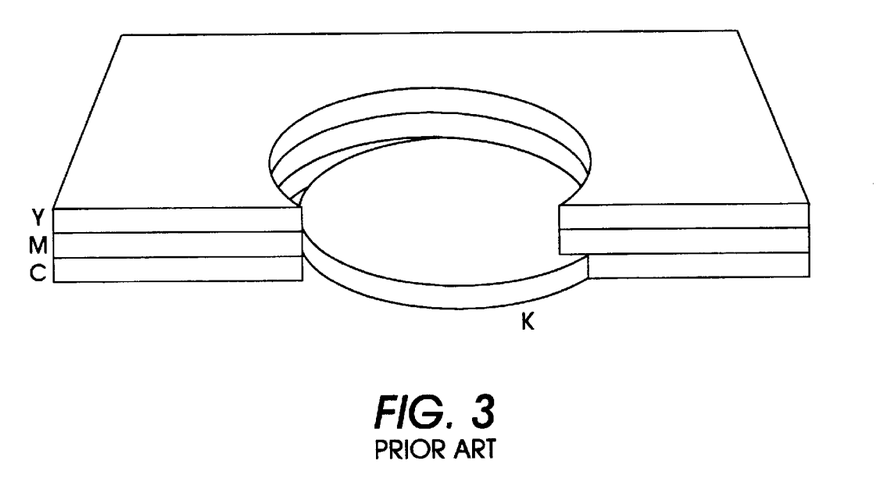

FIGS. 2 and 3 show print quality problems which can occur as a result of the prior art method shown in FIG. 1. In FIG. 2, the single-color black can be seen to have a gloss level and coverage level (toner height, in the example shown) which may be objectionably different from the color background. It is not shown that a single-color black object may also have an inadequate maximum density when imaged on some color fields. A further problem is shown in FIG. 3. In this case, an objectionable white fringe can occur around part of the black object due to misregistration of the black object in relation to the surrounding color field.

Figure 4:
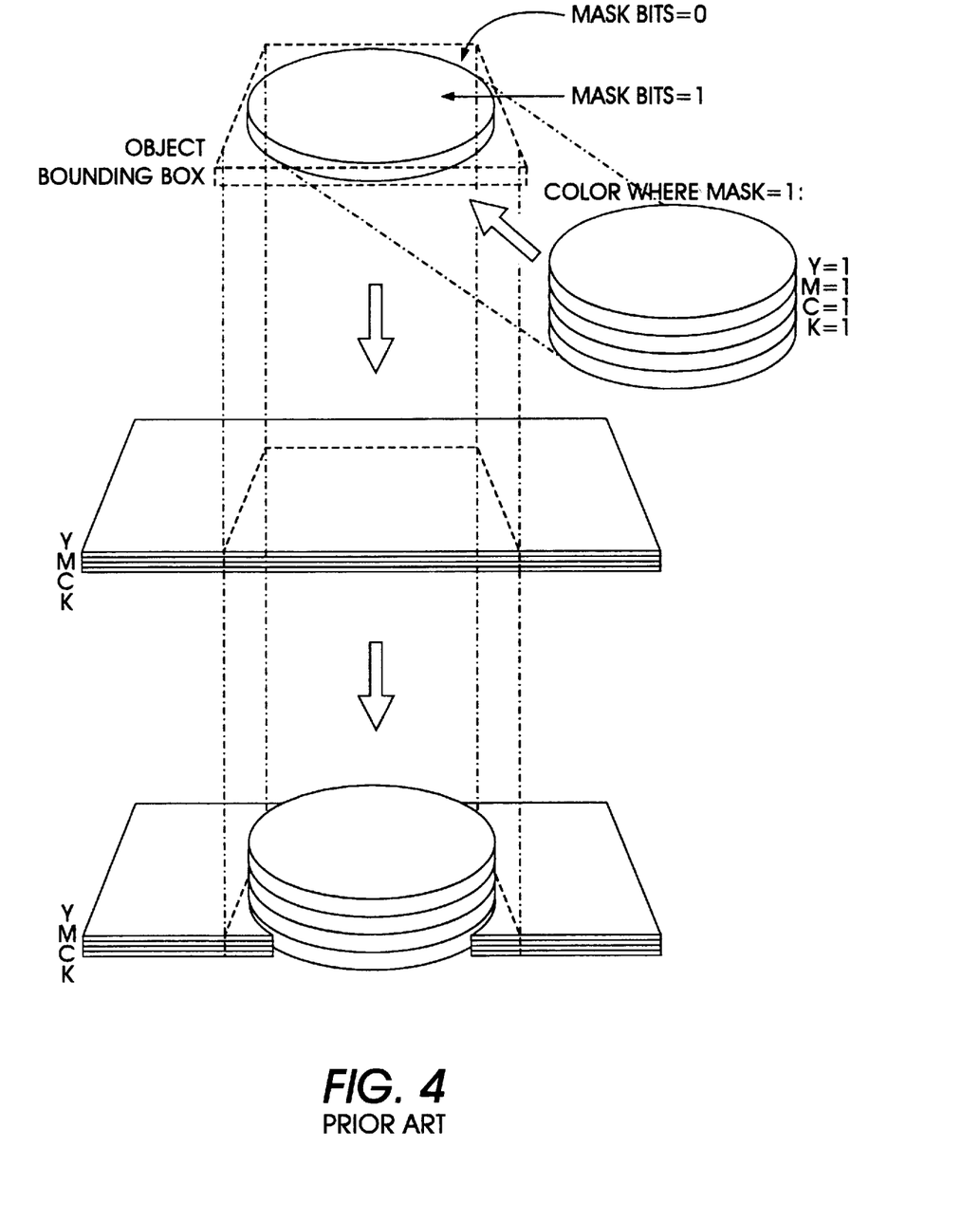
FIG. 4 shows a method of the prior art by which a process color black object is merged into existing separation bitmaps during page preparation process.

The opposite effect is shown in FIG. 4. In this case, a process black object is shown being merged into an existing set of bitmaps, one bitmap per separation. As explained in FIG. 1, in the prior art, for each separation bitmap, the merging process causes the color value of that separation to be written into the bitmap, obliterating whatever values were in that separation previously. The net effect is a large change in colorant coverage in each separation, and a very large change in colorant coverage overall at the location of the merged process black object.

Figure 5:
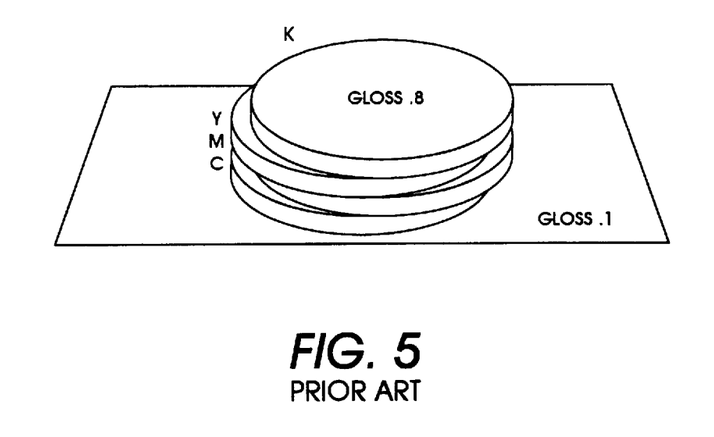
FIGS. 5 and 6 show sample outputs which demonstrate print quality problems produced by following the prior art method illustrated in FIG. 2.
Figure 6:
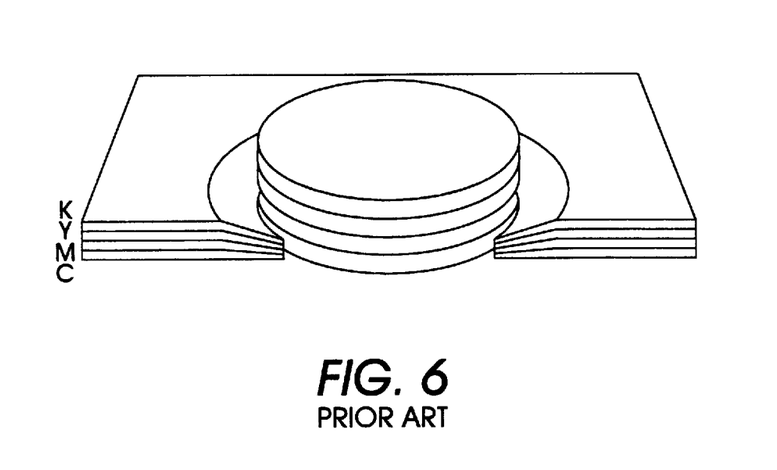

Some problems in print quality that the process black merging method shown in FIG. 4 may cause are shown in FIGS. 5 and 6. In FIG. 5, a black object is shown being imaged on top of a white paper background using process black composed of cyan, magenta, yellow, and black toners. As shown in FIG. 5, in certain printing systems objectionable height differences can occur between the white background and the total pile height of all toners used in process black. Further, large differences of gloss can occur, and with slight misregistration between separations, the edge of the process black object can spread, blur, and show chromatic fringes. Other problems with excess colorant coverage not shown in FIG. 5 can also occur, such as excessive bleeding and spread caused by excess ink in certain ink jet color printing systems. FIG. 6 shows a further problem with the prior art method of merging a process black object into a bitmap. In some printing systems such as xerographic systems, the excess toner height will also cause additional deletions in the color background surrounding the process black object, resulting in objectionable light colored fringes around the black object.

Figure 7:
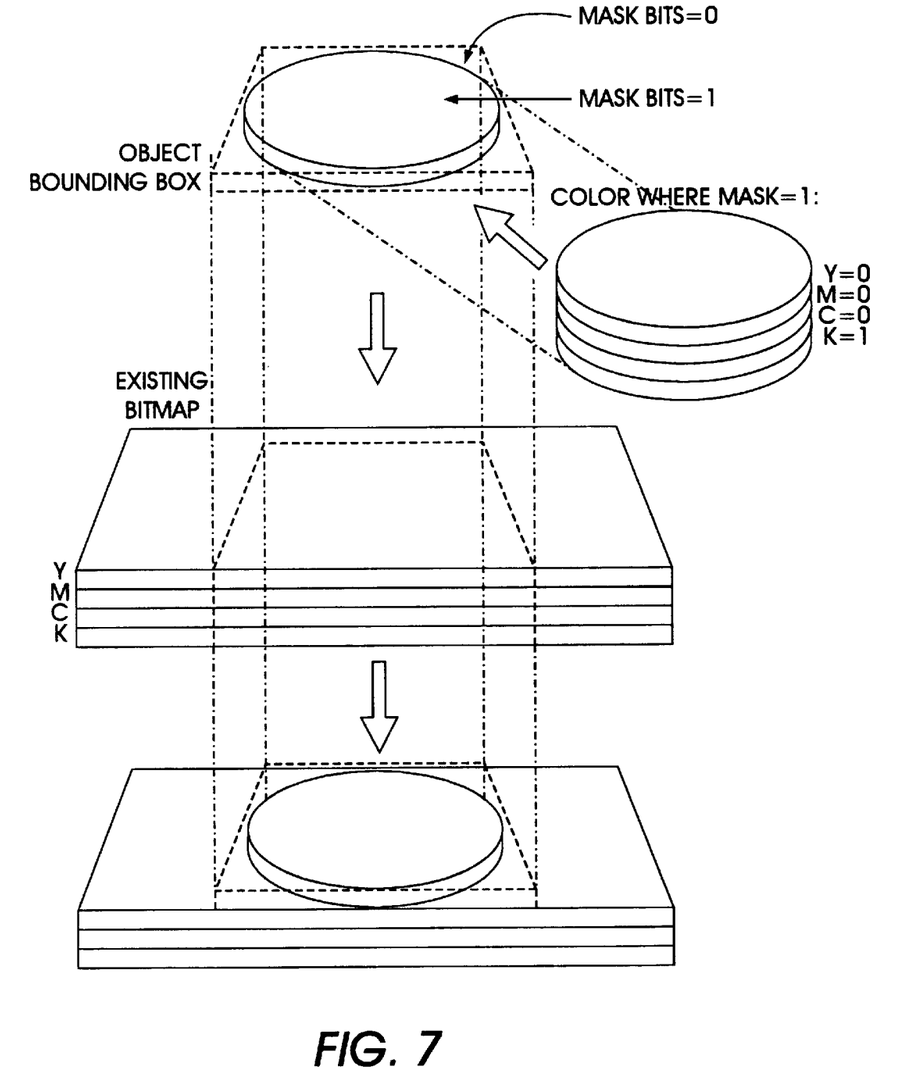
FIG. 7 shows by contrast to FIG. 1 the method of the invention by which a single color black object is merged into existing separation bitmaps during page preparation process.

FIG. 7 shows how the current invention changes the method shown in FIG. 1 for merging a single-color black object into separation bitmaps. The current invention detects black objects and merges them differently from other color objects into the existing bitmaps. Instead of writing the current value of each separation into the corresponding separation, only the black separation is written, and the other separations are left intact. The color remains black because of the black ink coverage, but the underneath color is unchanged.

Figure 8:
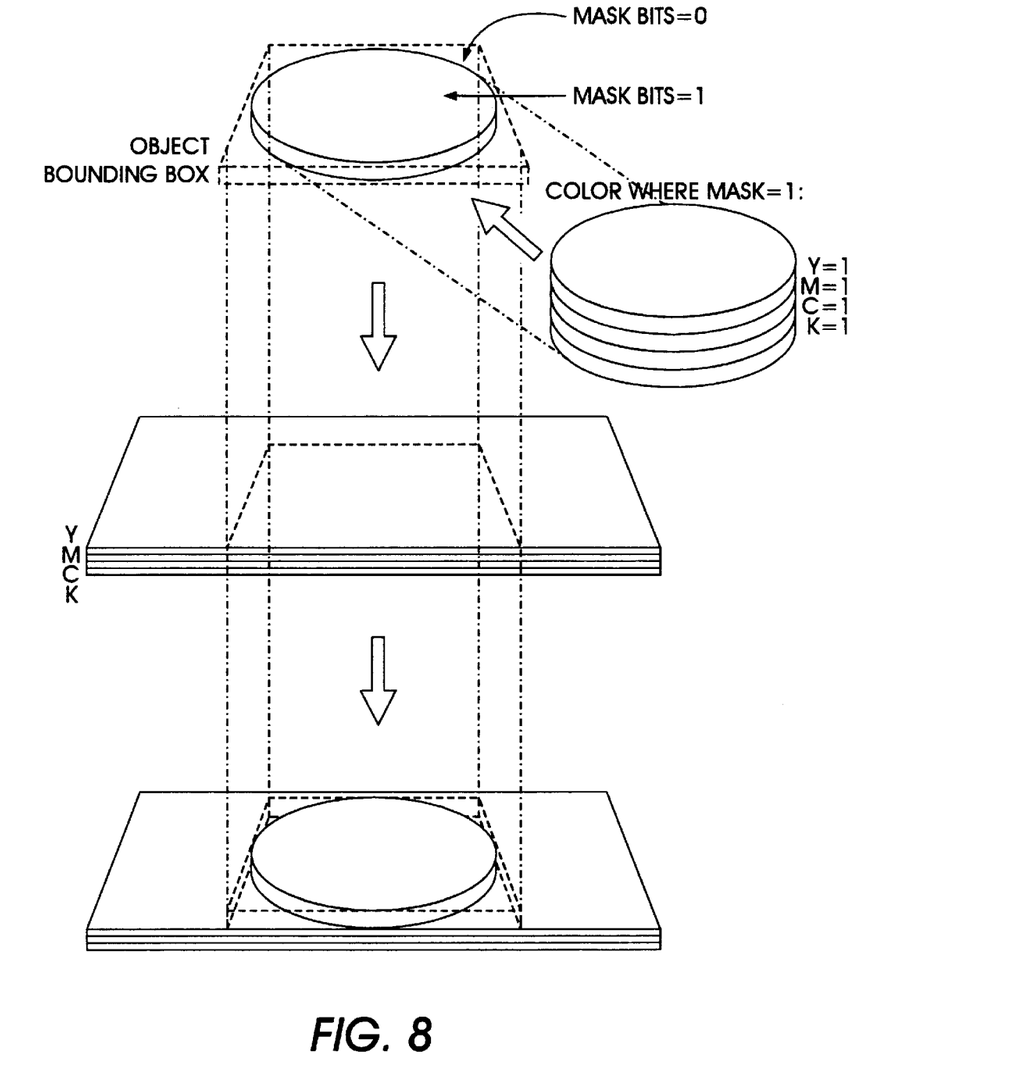
FIG. 8 shows by contrast to FIG. 4 the method of the invention by which a process black object is merged into existing separation bitmaps during page preparation process.

Similarly, FIG. 8 shows the result when a process black object containing non-black colorants is merged into existing separation bitmaps according to the methods of the invention. Again, the values in the non-black separations is ignored, and only the black separation is written.

Figure 9:
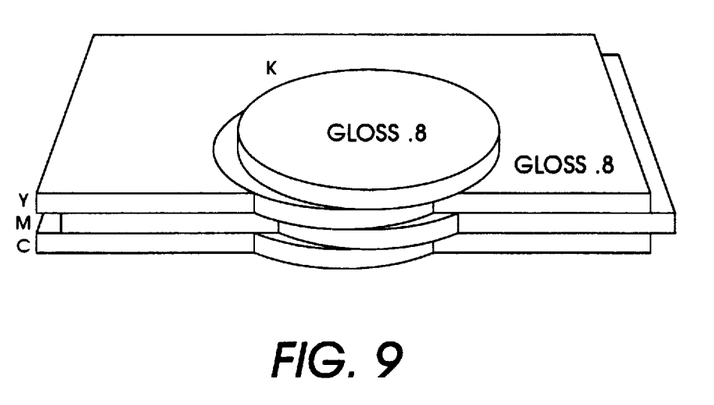
FIGS. 9 and 10 show sample outputs which demonstrate improved print quality produced by following the methods of the invention illustrated in FIGS. 7 and 8.
Figure 10:
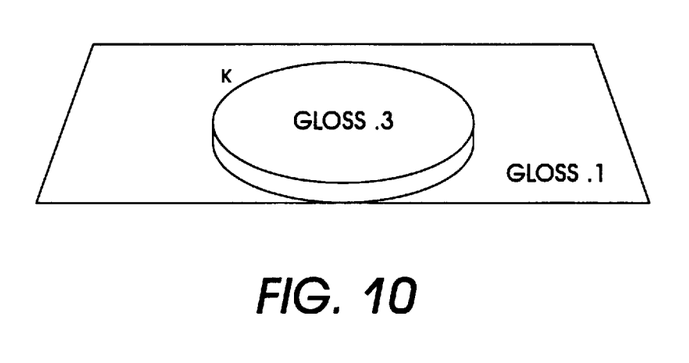

FIGS. 9 and 10 illustrate how the methods of the invention solve some of the print quality problems presented in FIGS. 5 & 6 and other problems. FIG. 9 shows that since the colorant coverage of the black object will now be very close in amount to the surrounding background color, the problems of insufficient gloss, density, and colorant coverage, and the problem of white fringes due to misregistration, deletion, or other interaction between separations are solved. FIG. 10 shows that since even a process black object will be printed as single-color black wherever the existing bitmaps are white, the problems of excessive colorant coverage, and the problem of color fringes due to misregistration or other interaction between separations are solved.

Figure 11:
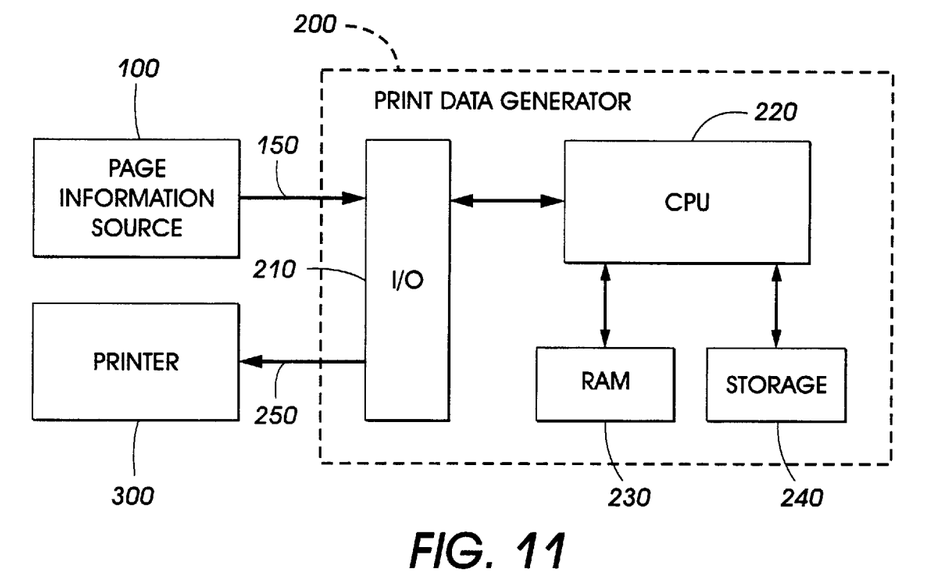
FIG. 11 is a block diagram of an apparatus made according to and for practicing the method of the invention, in which the changes to bitmaps according to the methods of the invention take place within the bitmap generator.

Referring now to FIG. 11, a generalized page printing system made according to the present invention is shown. It includes a page information source 100 connected via communication link 150 to a bitmap generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Bitmap generator 200 may be a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software In this case of shared computer hardware and separate software, the functions of page information source 100 and bitmap generator 200 remain distinct. The methods as described herein remain applicable through a wide range of apparatus configurations.

FIG. 11 shows an embodiment in which the bitmap generator 200 is programmed to carry out the methods described herein and shown in FIGS. 12–15. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by bitmap generator 200 and generator 200 is programmed to carry out the method of this invention, generator 200 may in certain situations modify the output commanded by the page representation. As described herein, generator 200 may change the composition of the color of a black object contrary to the command of the page representation before merging it into the generated print data. Thus, the page as sent by a conventional page information source 100 will be printed differently than described, in order to accomplish the objectives of this invention for improving print quality. The advantage of this configuration is that page representations received from any number and variety of conventional page sources 100 may be automatically modified by generator 200 to print with higher quality.

Figure 12:
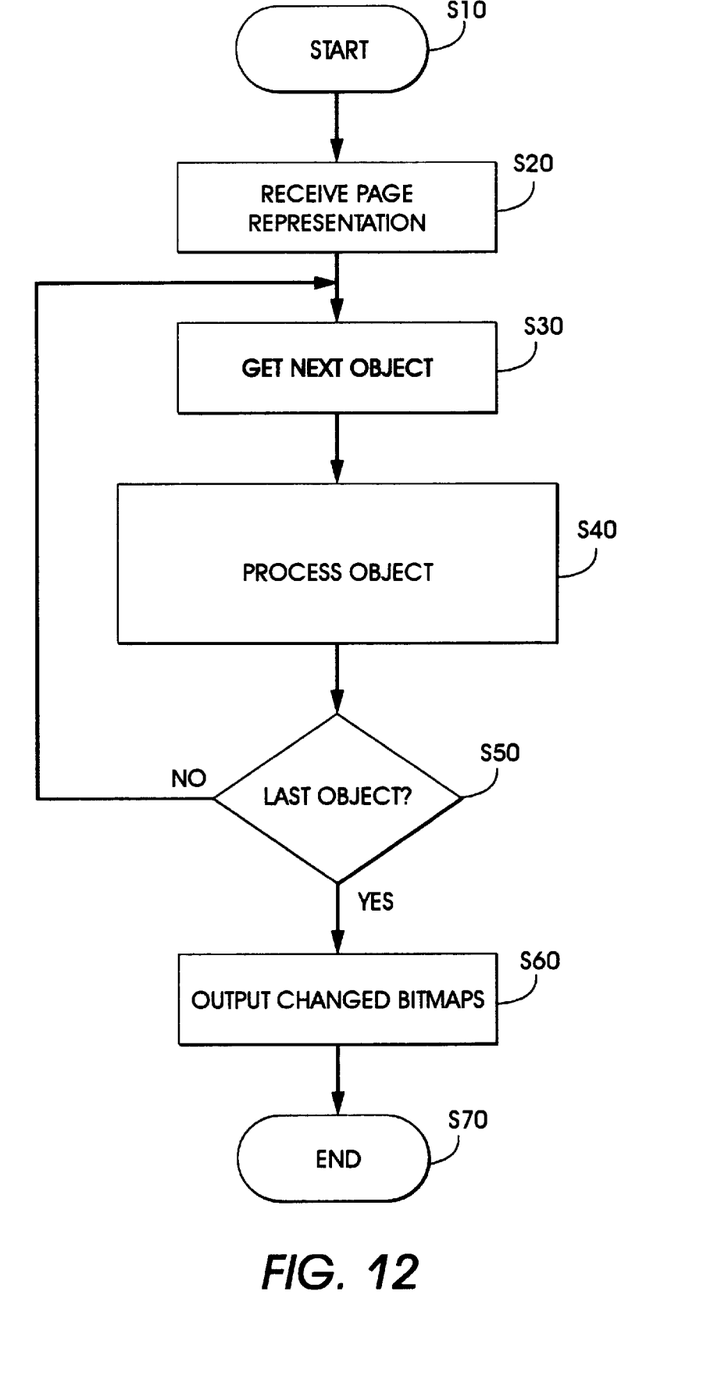
FIG. 12 shows a flowchart for the overall method by which a bitmap is produced with a background dependent black image.

FIG. 12 illustrates a generalized flow diagram of a process or method according to the invention by which a background dependent black image is formed. After starting in step S10, in step S20 a page representation is received. This page representation represents a collection of colored objects in a data format such as a conventional page description language or equivalent data format as previously described.

In step S30, the next object which has not yet been processed is retrieved from the page representation. This retrieved object is further processed in step S40 as will later be described in greater detail. In step S50, it is determined if this is the last object to be retrieved from the page description language. If it is not the last object, then control returns to step S30 where the next object is retrieved. Otherwise, if this is the last object defined by the page description language, control flows to step S60 where the bitmap, which has possibly been constructed differently than commanded by the page representation during the object processing step S40, is output.

The outputted changed bitmaps of step S60 consist of one bitmap per separation, where each separation corresponds to a colorant used in the printing process, and where the bitmaps provide instructions for printing each spot on the printable page for use by a raster color printer. In this case, the output step involves outputting the modified bitmap data to a network, a printer or a storage device. Finally, control flows to step S70, where the process ends.

Figure 13:
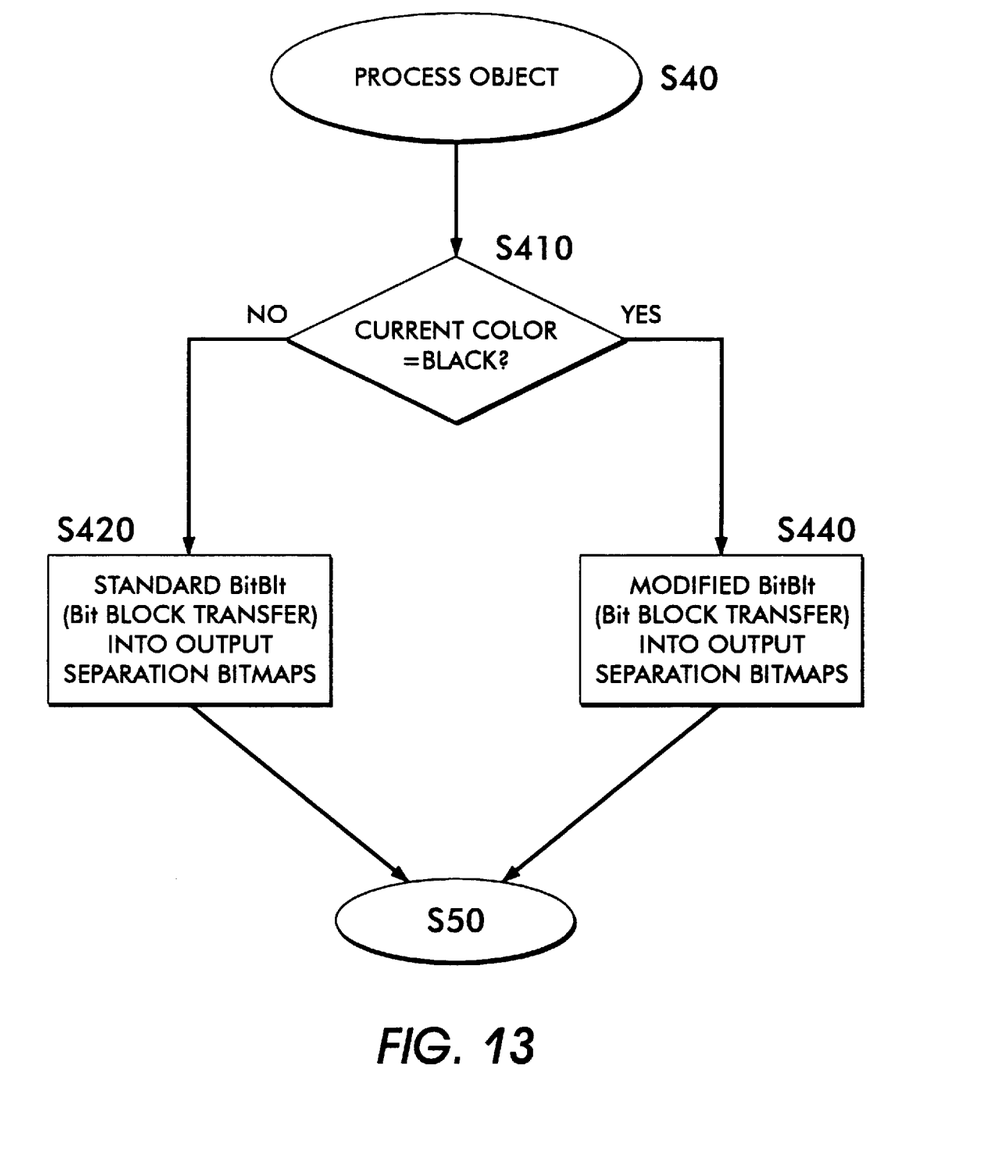
FIG. 13 shows the method by which each object is processed before being merged into the output bitmaps.

FIG. 13 shows the step S40 of processing an object in greater detail. In step S410, the color of the object to be processed is examined. The color of an object can be expressed in many color spaces or systems. However, in any commonly used color space it is possible to efficiently determine if the color black has been commanded. For example, some systems use an RGB color space, and black is generally defined in such systems as R=G=B=0. Other systems express colors as combinations of cyan (C), magenta (M), yellow (Y), and black (K). In such systems, black may be defined as C=M=Y=1, or alternatively as C=M=Y=K=1 (two forms of process black), or alternatively as K=1 (single-color black). In the L*a*b* system, L* is an expression of the luminance of a color, and L*=0 (zero luminance) is black. In practice, black may be defined more broadly if desired. For example, an L*<5 or a K>0.95 could be defined to be treated as black if desired. Some systems allow many color spaces to be used intermixedly, but in each case it is possible to define what combinations of the components of each color space will be defined as the color black.

If in step S410 the object color is not black, control flows to step S420, in which a standard BitBlt (Bit Block Transfer—described in FIG. 14) is performed to merge the object into the output separation bitmaps in such a way that it will be printed in the correct location, with the correct shape, with the correct relation to other objects on the page, and with the correct color.

Returning to step S410, if the object color is found to be black, the processing proceeds to step S440 where a modified BitBlt, modified according to the methods of this invention, is performed to merge the object into the output separation bitmaps in such a way that it will be printed in the correct location, with the correct shape, with the correct relation to other objects on the page, but with a black color which may have a different composition from the commanded black color.

Figure 14:
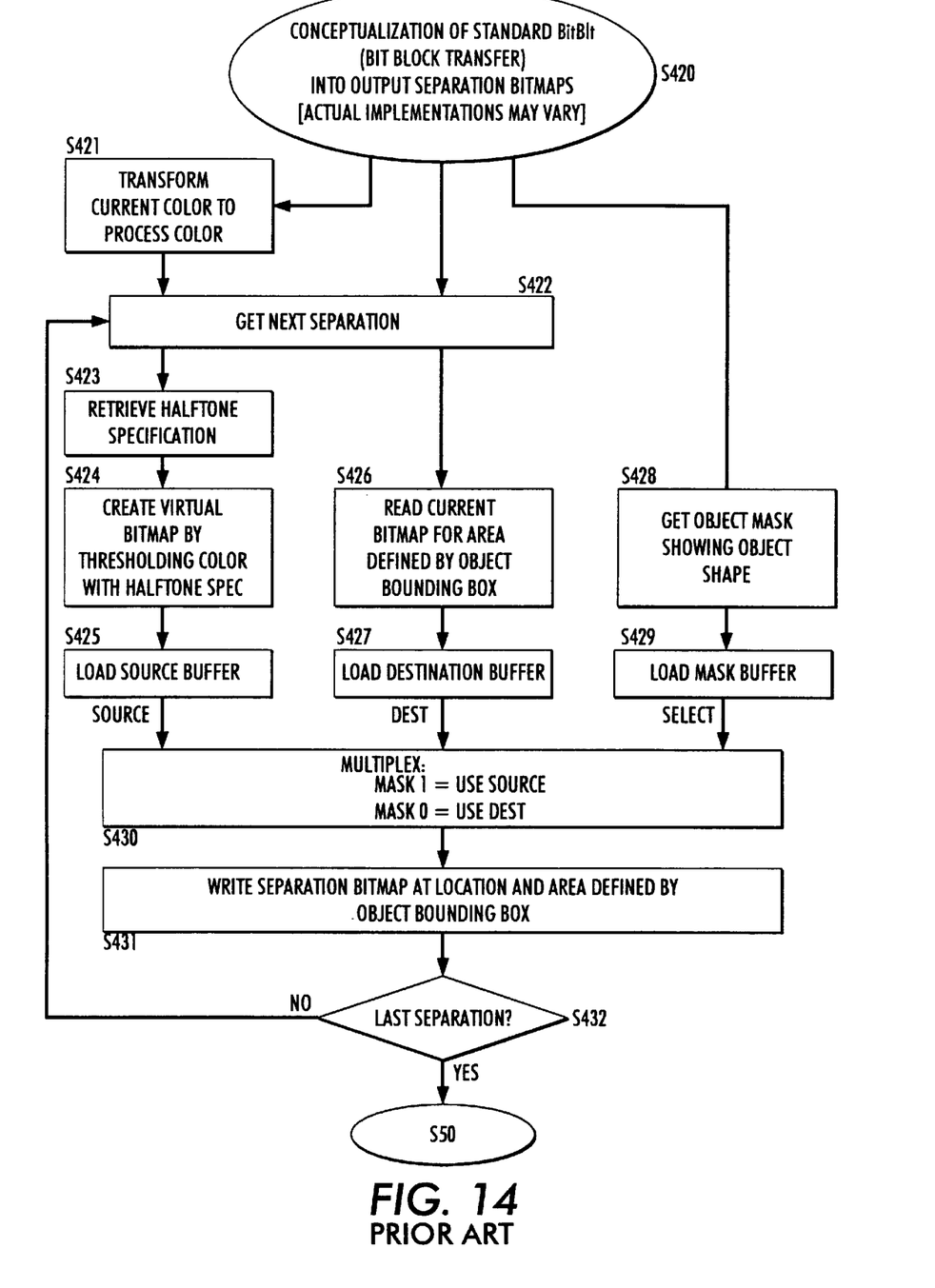
FIG. 14 illustrates conceptually the prior art method by which an object is normally merged into an existing bitmap, which is the method used in the invention for all non-black objects.

FIG. 14 shows conceptually the step S420 of performing a standard BitBlt (Bit Block Transfer) into a set of output bitmaps, one per separation. Actual implementations of this conventional step of merging an object into a bitmap may include modifications and special cases for performance reasons, but conceptually will be convergent with the steps shown in FIG. 14.

In step S422, the current color is retrieved from the graphical state and transformed into a process space. Although page description languages often allow the color of an object to be be expressed in many different color spaces or systems such as calibrated RGB or L*a*b*, all must ultimately be transformed to the specific colorant values needed by the particular printing process to accurately render the desired color. This color space is called a process space, most generally CMYK (cyan, magenta, yellow, black).

After the current color is transformed, in step S422 a loop is entered which processes each separation in turn. Three paths are followed in parallel, each leading to the loading of a buffer. In the first path, in step S423, a halftone specification is retrieved which defines the halftone dot used for this particular separation. In step S424, by thresholding the separation value for the current color against the halftone specification of the dot, a "virtual" bitmap is created which gives the bits which need to be turned on in this separation in order to print correctly the color value designated by the current color. For example, in CMYK color space, the C (cyan) separation will have a specified value. This value is achieved in reality by turning the right number of dots on or off in the printer. Once the virtual bitmap is defined, the value is loaded into a Source Buffer in step S425.

In the second path, in step S426 the currently existing bitmap is read at the exact location and area defined by the location and bounding box of the current object which is about to be merged. In step S427, these bits are loaded in order into a Destination Buffer.

Finally, in the third path, in step S428, the mask which defines the shape of the object is retrieved, and in step S429, is loaded into the third buffer, the Mask Buffer.

Once all buffers are loaded, in step S430 a Multiplexing operation takes place, in which the Mask Buffer is used to select between the Source Buffer and the Destination Buffer. Wherever the Mask is 0, that is, outside the defined shape of the object, the original Destination bits are chosen to restore the bits that were already there. However, wherever the Mask is 1, that is within the object, the new Source bits are chosen to be written as new data into the bitmap.

In step S431, the chosen bits are written into the existing bitmap in order, at the location where the object is to be written and in the size of the bounding box. This has the effect of writing the halftoned color of the object in exactly the location and shape defined by the mask.

Lastly, in step S432, the control loops back to step S422 if there are more separations to be processed, or exits to step S50 if this is the last separation.

Figure 15:
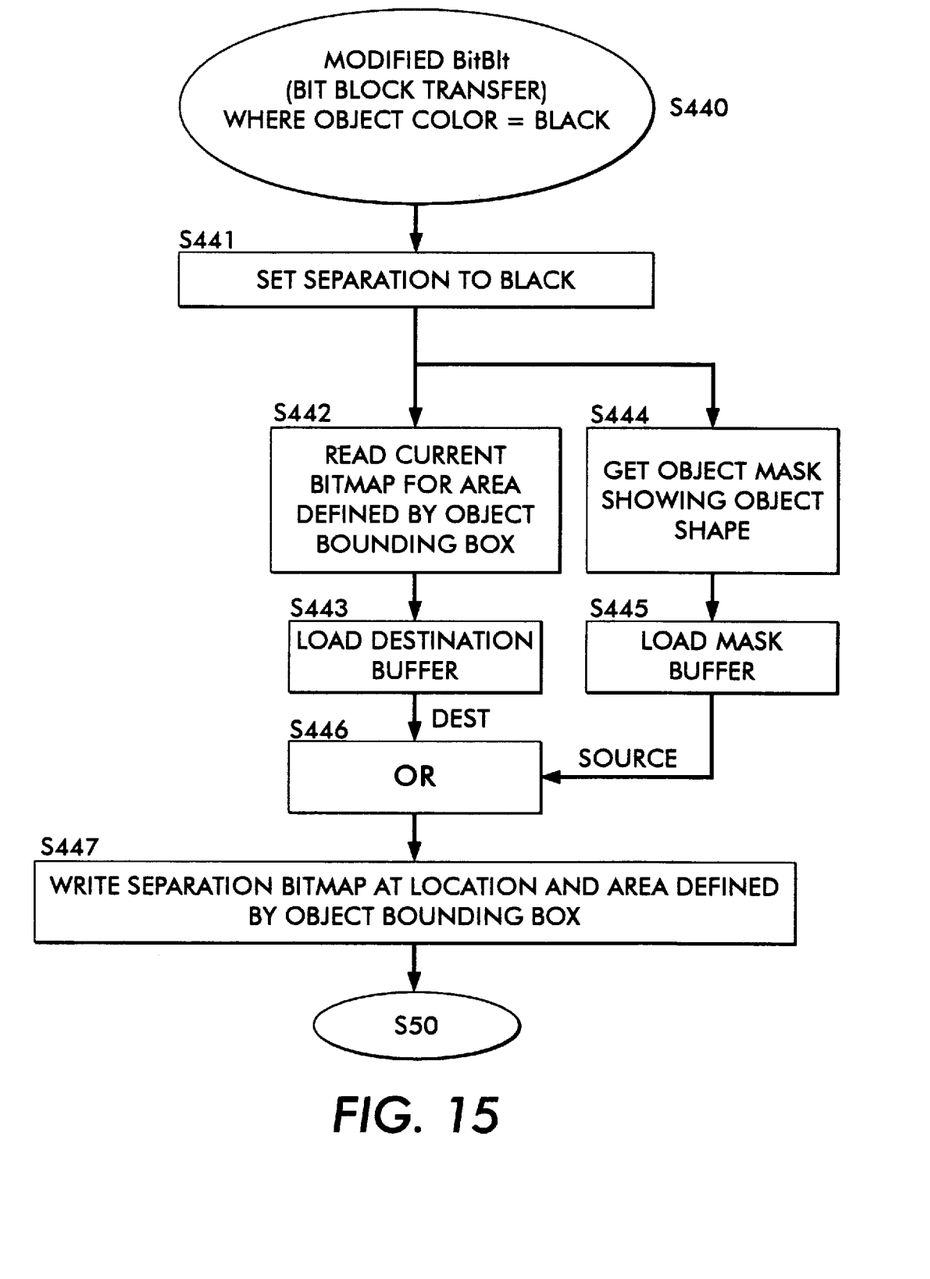
FIG. 15 illustrates conceptually the method of this invention by which a black object is merged into an existing bitmap.

FIG. 15 shows conceptually step S440, a method according to this invention of performing a BitBlt (Bit Block Transfer) into a set of output bitmaps.

In step S441 the current separation is set to black, because for each non-black separation no action is taken at all. From step S441, control flows to two parallel paths, each of which load a buffer. The first path, shown by steps S442 and S443, loads the Destination Buffer in the manner described above in FIG. 14. Similarly, the second path in steps S444 and S445 loads the Mask Buffer as described in FIG. 14.

However, in contrast with the standard BitBlt of FIG. 14, in FIG. 15 step S446 shows that the Mask Buffer is now used as the Source, and the Destination Buffer as the Destination, and the two buffers are no longer multiplexed but simply logical OR'd. This is because since we know the object is black (ie, all bits turned on), the Mask Bits adequately define that color value (the Mask bits are all 1 within the shape of the object). By OR-ing the two input streams, wherever the Mask is 0 (ie, outside the shape of the object), the Destination bits will be returned to their current value. However, wherever the Mask is on, 1 bits (black) will be written into the black bitmap. It would, of course, be possible to perform the black separation mixing as in FIG. 14, but the method described in FIG. 15 avoids both color transformation and multiplexing steps.

Finally, in step S447, the resulting bits are written into the black bitmap at the location and area defined by the bounding box of the current object, and control exits to step S50.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. The method of printing to a color printer from a number of color separations, one for each process color, one of which is black, to print a black area of a given shape over a color background area, each area comprising pixels, comprising the steps of:

generating signals describing each of said number of separations for said color background area as bit maps of pixels, in the black separation and within said shape of said black area, modifying said bit map so that all pixels will be printed in black, in all other separations, not modifying any pixels, and printing said modified black and non-modified color bit maps.

2. The method of claim 1 wherein said black area is defined as an area containing ON pixels, said black color separation is defined as a bit map of pixels, each of which is printed in black if the pixel is ON, and said modifying step comprises ORing said black area and black separation pixels and using the result as the final black separation to be printed.

3. The method of claim 1 wherein said modifying step comprises reading each pixel from the black separation, modifying it if necessary, and returning it to said black separation.

4. The method of claim 1 wherein said first generating step comprises converting the pixels of each separation of an electronic image into a bit map of halftone dots comprising binary pixels.

* * * * *